United States Patent
Minaee et al.

(12)

(10) Patent No.: US 6,558,635 B2
(45) Date of Patent: May 6, 2003

(54) MICROWAVE GAS DECOMPOSITION REACTOR

(76) Inventors: Bruce Minaee, 607 Airpark Rd., Suite B, Napa, CA (US) 94558; Kambiz Farnaam, 607 Airpark Rd., Suite B, Napa, CA (US) 94558; Rafik Grant Ayvazyan, 607 Airpark Rd., Suite B, Napa, CA (US) 94558

( * ) Notice: Subject to any disclaimer, the term of this patent is extended or adjusted under 35 U.S.C. 154(b) by 209 days.

(21) Appl. No.: 09/804,532

(22) Filed: Mar. 12, 2001

(65) Prior Publication Data

US 2002/0127155 A1 Sep. 12, 2002

(51) Int. Cl.⁷ .................................................. C01J 19/08
(52) U.S. Cl. ...................................... 422/186; 219/678
(58) Field of Search ...................... 422/186; 219/678; 204/164

(56) References Cited

U.S. PATENT DOCUMENTS 5,517,085 A * 5/1996 Engemann et al. ..... 315/111.21
6,261,525 B1 * 7/2001 Minaee ....................... 422/186

* cited by examiner

Primary Examiner—Nathan M. Nutter
Assistant Examiner—Thao Tran
(74) Attorney, Agent, or Firm—David E. Lovejoy

(57) ABSTRACT

A microwave reactor for decomposing waste green house gases resulting from the manufacture of semiconductors and from other industrial processes. The microwave reactor includes a plasma chamber having a gas inflow port spaced apart from a gas outflow port for transporting gases through the plasma chamber. A gas plasma is generated in the plasma chamber to facilitate the gas decomposition. The structure of the microwave reactor includes an insulating cover protruding into the plasma chamber and forming an internal cavity that is isolated from gases in the plasma chamber. A microwave antenna extends into the internal cavity of the plasma chamber to couple the microwave energy into plasma chamber for causing a plasma to form in the gases.

22 Claims, 6 Drawing Sheets

MICROWAVE GAS DECOMPOSITION REACTOR

CROSS REFERENCE

PROCESS GAS DECOMPOSITION REACTOR, invented by Bruce Minaee, filed May 17, 2000 and having SC/Ser. No: 09/572,111.

BACKGROUND OF THE INVENTION

The present invention relates to the field of gas decomposition and, more particularly, to a microwave reactor for decomposing waste gases resulting from the manufacture of semiconductors and from other industrial processes.

Certain gases such as Perfluorinated Compounds (PFCs) including nitrogen trifloride, $NF_3$, and sulfurhexafloride, $SF_6$, and hydrofluorocarbons (HFCs) emitted by industrial processes, such as semiconductor processes, are harmful when released into the atmosphere. PFCs and HFCs are categorized as greenhouse gases because of their strong infrared absorption and long atmospheric lifetimes. PFCs and HFCs act similar to $CO_2$ in causing the greenhouse effect. Because of their potential long term impact on the global climate, PFC's, HFC's, $NF_3$ and $SF_6$ have been included in the Kyoto Protocol which is aimed at significantly reducing the release of unwanted gases into the atmosphere.

The above-identified, cross-referenced application PROCESS GAS DECOMPOSITION REACTOR describes an improved microwave reactor for removing unwanted gases from industrial processes. In the cross-referenced application, a microwave reactor generates a plasma for decomposition of perfluorinated and hydro fluorocarbon compounds in a gas stream emerging from an industrial process, for example, a semiconductor manufacturing process. The reactor features a pair of magnetrons feeding a pair of launching waveguides to a pair of helical coils forming a microwave induction structure within a plasma chamber coaxial with the gas flow path.

In the cross-referenced application, the plasma chamber includes inlet and outlet openings through which reactant and additive gases (such as oxygen, hydrogen or water vapor) enter the chamber and exit the chamber for gas flow-through processing. The openings of the plasma chamber are through flanges which mate with corresponding flanges in exhaust gas lines from the industrial process apparatus. The gases enter the plasma microwave chamber through a standard vacuum flange, are dispersed, and undergo plasma decomposition reactions in the microwave chamber. The decomposition reactions result in hydrofluorocarbonated compounds and perfluorocarbonated compounds and these and other exhaust gases are evacuated from the plasma chamber through directly mounted flanges at the outlet of the plasma chamber.

In the cross-referenced application, decomposition reactions occur once the microwave chamber has been energized to cause a plasma and the reactant and additive gases are flowing. A microwave generated field causes ionization of the gas molecules by extracting electrons from them. These electrons are accelerated by the microwave generated field and cause more ionization and cracking of the gas molecules. The cracked reactant molecules and the cracked additive gas molecules react to form by-products that can be scrubbed by a wet scrubber.

While the cross-referenced application is a significant improvement over other gas reactors, the embodiments described are constrained by the ability to economically generate microwave-induced plasmas without excessive wear on the microwave components. As semiconductor processes use larger and larger gas-flow tubes for larger and larger semiconductor wafers and other parts, a need exists for larger, more efficient and more easily installed and maintained microwave reactors for removing unwanted gases.

Accordingly, there is a need for improved microwave reactors to decompose PFCs, HFCs and other unwanted gases suitable for insertion in the lines of processes used in industry, particularly in the semiconductor manufacturing industry.

SUMMARY

The present invention is a microwave reactor for decomposing waste green house gases resulting from the manufacture of semiconductors and from other industrial. The microwave reactor includes a plasma chamber having a gas inflow port spaced apart from a gas outflow port for transporting gases through the plasma chamber. A gas plasma is generated in the plasma chamber to facilitate the gas decomposition. The structure of the microwave reactor includes an insulating cover protruding into the plasma chamber and forming an internal cavity that is isolated from gases in the plasma chamber. A microwave antenna extends into the internal cavity of the plasma chamber to couple the microwave energy into plasma chamber for causing a plasma to form in the gases. A microwave generator generates microwave power. A microwave connector connects the microwave power from the microwave generator to the plasma chamber. The microwave connector includes a microwave transport for transporting the microwave energy, a first microwave coupler for coupling the microwave energy from the microwave generator to the microwave transport with a matched impedance, and a second microwave coupler for coupling the microwave energy from the microwave transport to the plasma chamber with a matched impedance The second microwave coupler includes the microwave antenna extending into the internal cavity of the plasma chamber.

The foregoing and other objects, features and advantages of the invention will be apparent from the following detailed description in conjunction with the drawings.

DETAILED DESCRIPTION

Figure 1:
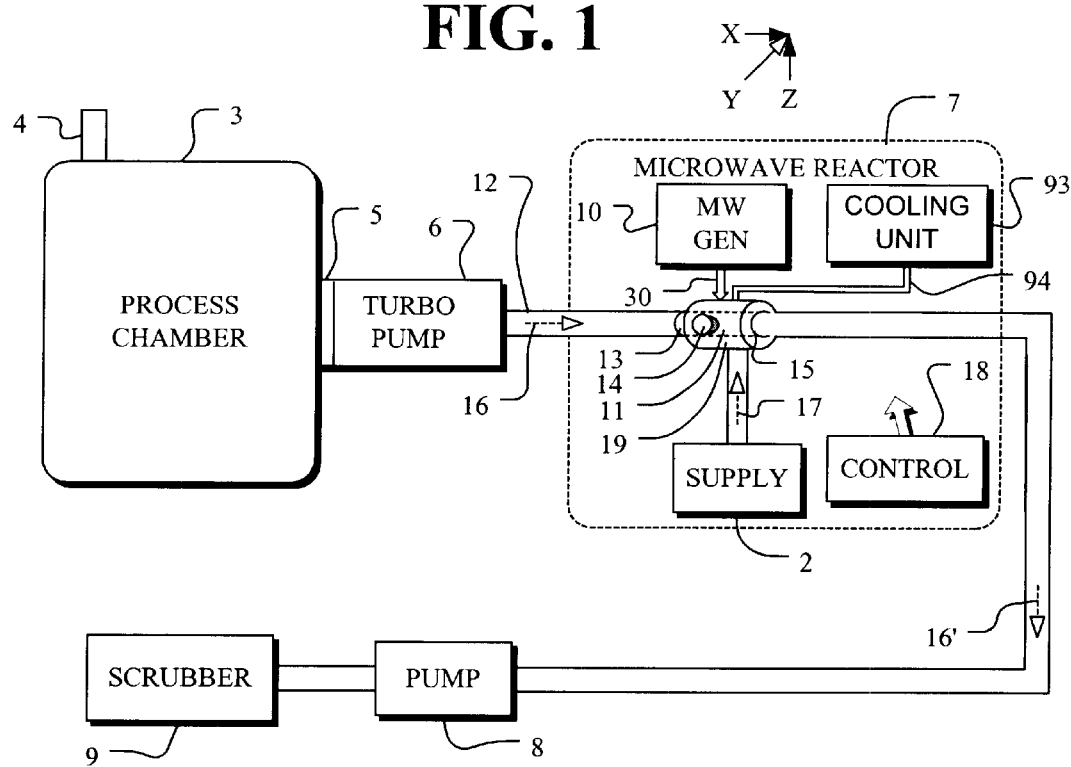
FIG. 1 depicts a microwave reactor positioned in the exhaust gas line of an industrial process chamber for decomposing green house gases.

In FIG. 1, the process chamber 3 is used for industrial processes that exhaust green house gases such as PFCs and HFCs. Such gases are frequently found in the semiconductor industry. The industrial process chamber 3 includes an input port 4 for receiving input reactants used in the industrial process and an output port 5 for exhausting gases 16. A turbo pump 6 is connected to pump the gases from the process chamber 3 and deliver the exhaust gases 16 to the gas line 12. The gas line 12 connects to a microwave reactor 7 which operates to process the exhaust gases 16. The microwave reactor 7 has a plasma chamber 11 with an inflow port 13, an outflow port 15 and one or more other ports 14. The diameter of inflow port 13 conveniently matches the diameter of the outflow port of the turbo pump 6 or is otherwise connected so that exhaust gases 16 enter the inflow port 13 with a minimum of back pressure resulting from the piping connections. The plasma chamber 11 is connected with exhaust piping 12 from the industrial process carried out in process chamber 3. The microwave reactor 7 includes, or is connected to, a reactant supply 2 which provides reactant gases 17 such as hydrogen, oxygen and water vapor that are used in the plasma chamber 11. A microwave generator 10 provides microwave energy to the plasma chamber 11. A control unit 18 provides the measurement and control signals used in operating the microwave reactor 7. The microwave reactor 7 includes, or is connected to, a cooling unit 93 that provides liquid or gas cooling through line 94 for the chamber 11 and/or other components of the microwave reactor 7.

The microwave reactor 7 causes gases 16 together with reactants 17 in plasma chamber 11 to become ionized by collisions with electrons and ions as a result of the microwave energy supplied to chamber 11. In such a plasma environment, the PFCs and HFCs decompose. The reactant gases 17, such as hydrogen, oxygen or water vapor, introduced into the plasma chamber 11 facilitate formation of reactions with the decomposed constituents of the PFCs and HFCs. The reactant gases 17 are metered by flow controllers in reactant supply 2 and are dispersed throughout the plasma chamber 11 by injection under the operation of control 18.

After microwave decomposition of PFCs and HFCs in plasma chamber 11, the resultant exhaust gases 16' are pumped from the plasma chamber 11 by pump 8 which in turn delivers the exhaust 16' to a scrubber 9 that separates components of the exhaust 16' and typically results in, among other things, a non-polluting ash that is easily disposable.

Figure 2:
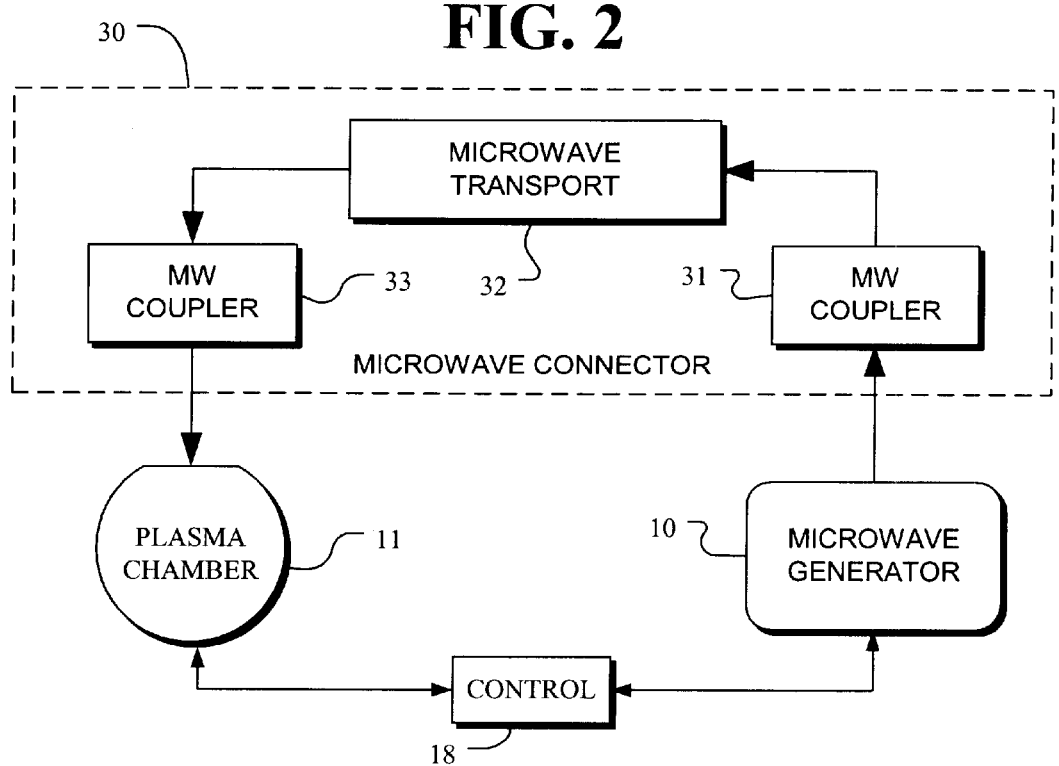
FIG. 2 depicts a schematic representation of the microwave circuit that conducts the microwave energy in the microwave reactor of FIG. 1.

In FIG. 2, a schematic representation is shown of the microwave circuit that conducts the microwave energy in the microwave reactor of FIG. 1. The microwave energy from the microwave generator 10 is conducted through a microwave connector 30 to the plasma chamber 11. The control 18 controls the generation of power by the microwave generator 10 and senses and controls the resulting reactions in the plasma chamber 11. The microwave connector 30 includes a microwave coupler 31, a microwave transport 32 and a microwave coupler 33. The function of the microwave coupler 31 is to match the impedance (electric and magnetic) input to the microwave transport 32 to the output impedance of the microwave generator 10. The function of the microwave transport 32 is to efficiently transport the microwave energy over a distance that separates the microwave generator 10 and the plasma chamber 11. The function of the microwave coupler 33 is to match the electrical impedance output from the microwave transport 32 to the input impedance of the plasma chamber 11 so that microwave energy is efficiently delivered to the plasma chamber 11.

In order to have an efficient transfer of energy from a source such as microwave generator 10 to a load such as the plasma chamber 11, the impedance of the load is desirably matched to the impedance of the source. Since these impedances are usually not the same, the microwave couplers 31 and 33 require impedance matching to ensure an efficient transfer of microwave energy.

Figure 3:
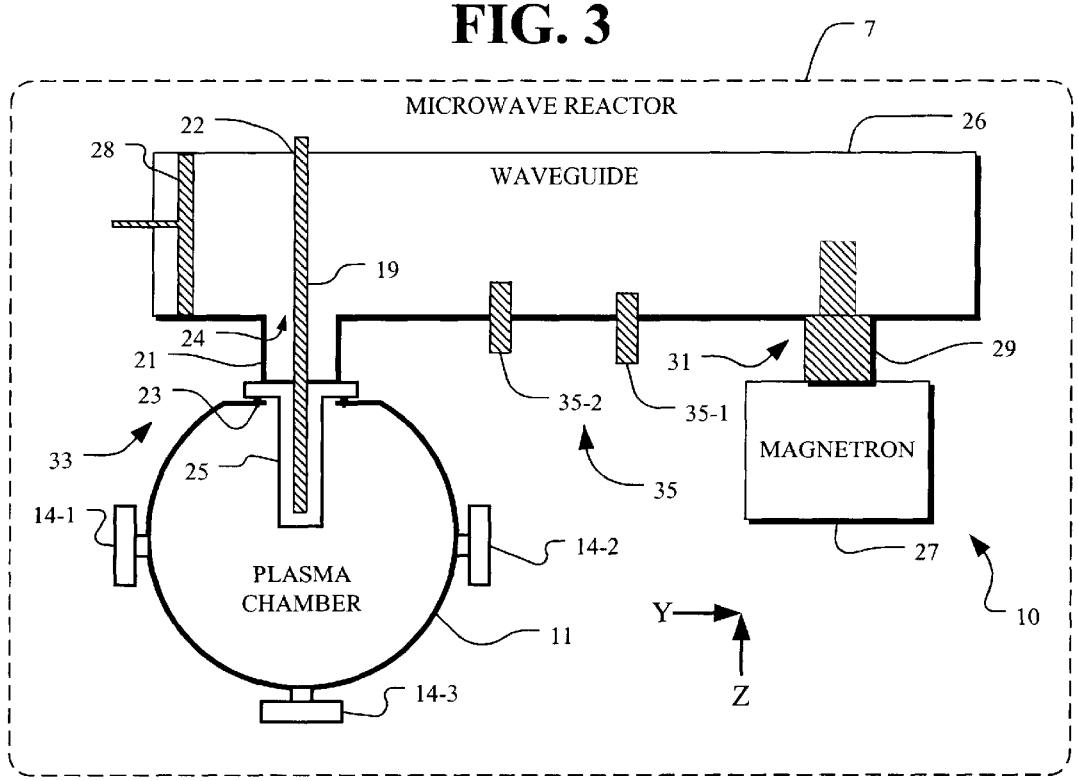
FIG. 3 depicts one embodiment of the microwave reactor of FIG. 1.

In FIG. 3, a waveguide embodiment used in the microwave reactor 7 of FIG. 1 is shown. The microwave generator includes magnetron 27 formed, for example, by a microwave oscillator, not shown, that is coupled to the microwave waveguide 26 through a microwave coupler 31. The microwave coupler 31 includes an oscillator antenna 29 that matches the impedance of the magnetron 27 to the waveguide 26. The magnetron 27 delivers microwave energy into the waveguide 26 at the end distal to plasma chamber 11. The dimensions of the waveguide are selected to provide a resonant cavity at the operating microwave frequency, typically 2450 MHz. The input power to the magnetron is typically from a power supply that generates a high voltage DC which may be in a pulse format.

Low cost power supplies, like those used for typical microwave ovens, provide an input to the magnetron using an LC circuit including a transformer, a capacitor and a diode. The power supply provides a 60 Hz half wave DC voltage that is ON for about $\frac{1}{120}$ of a second and OFF for about $\frac{1}{120}$ of a second. In the countries where the power line frequency is 50 Hz, then the ON and OFF times are $\frac{1}{100}$ of a second. Magnetrons used for more precise applications usually are supplied by a constant high-voltage DC power supply. In addition to a high-voltage DC, the filament of the magnetron also has a low-voltage, high-current AC power input (for example, 5 volts at 20 amps). The AC power for the high-voltage DC power supply that feeds the magnetron can be any convenient value, such as 110 V single phase, 208 V single phase, 208 V three phase.

At the end of the microwave waveguide that is proximate to plasma chamber 11, a microwave coupler 33 couples the microwave energy from the waveguide 26 to the plasma chamber 11. The microwave coupler 33 includes an opening 22 that permits a plasma antenna 19 to connect into the waveguide 26, through opening 24 and connector 21 into the plasma chamber 11 within a non-conducting cover 25. The cover 25 has a vacuum seal 23 with the plasma chamber 11. The plasma antenna 19 couples microwave energy from waveguide 26 into the plasma chamber 11. In the embodiment of FIG. 3, the antenna 19 is movable within the opening 22 so that the amount of extension of antenna 19 into plasma chamber 11 is adjustable. The adjustment of antenna 19 aids in matching the impedance between the waveguide 26 and the plasma chamber 11.

When the environment within plasma chamber 11 is suitable, a plasma is generated and operates to decompose gases flowing through the chamber 11. The cover 25 permits the opening 22 and the antenna 19 to extend into the interior of the plasma chamber 11 without actual contact with the gases that are present. In this way, corrosion of the antenna by the gases is avoided. Also, the microwave components including the waveguide 26 and the antenna 19 are all located external to locations where a vacuum is required.

Conditions within the plasma chamber 11, such as temperature, pressure and plasma operation are sensed by transducers inserted through sensor ports 14-1, 14-2 and 14-3 penetrating through the housing 63 of plasma chamber 11. The housing 63 is typically made of a solid block of aluminum. An outer wall of housing 63 can be stainless steel to protect the interior from damage. The ports 14-1, 14-2 and 14-3 typically each have flanges that resemble standard vacuum flanges for vacuum chambers.

The housing 63 has an inflow port 13 and an outflow port 15 which have screens 13' and 15', respectively, across the openings of the inflow port 13 and the outflow port 15 through which the gas 16 of FIG. 1 flows. The screens 13' and 15' are in good electrical contact with the housing 63 that encloses the microwave chamber 11 and therefore "close" the plasma microwave region at either end of chamber 11. Also, the screens 13' and 15', in some embodiments, are coated with a catalyst that is useful in the breakdown of the input gas.

Typically, the port 14-1 is used for optical fiber to observe the optical emission spectra of the plasma within plasma chamber 11. Typically, the port 14-2 is used for an optical diode for detecting the presence of the plasma. Typically, the port 14-3 is used for a pressure switch to cause an alarm if pressure in the plasma chamber exceeds a maximum level.

In FIG. 3, the impedance of the right side of the waveguide 26 is matched to the impedance of the magnetron 27 by the geometry of the waveguide and the antenna 29. The dimensions of the waveguide 26 are selected to carry the microwave energy efficiently to the other side. Tuning rods 35 are inserted and adjustable for the amount of extension into waveguide 26, further or less, for tuning the waveguide 26. On the other side, the antenna 19 picks up the energy in the waveguide and delivers it to the plasma chamber 11. The impedance of the antenna 19 is matched to the waveguide 26. A plate 28 inside the waveguide 26 is movable to tune the waveguide 26 and match the impedance of the antenna 19.

Figure 4:
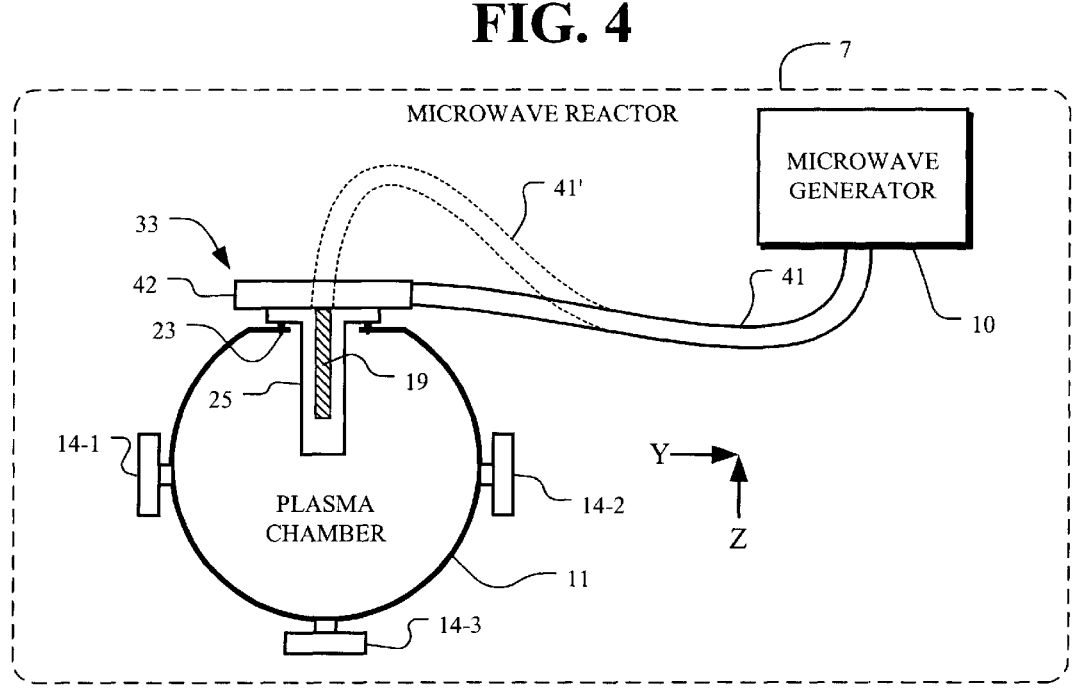
FIG. 4 depicts another embodiment of the microwave reactor of FIG. 1.

FIG. 4 depicts a coaxial cable embodiment used in the microwave reactor 7 of FIG. 1. A coaxial cable 41 functions as a transmission line for conducting microwave energy from the microwave generator to the plasma chamber 11. The length of coaxial cable 41 is selected for efficiently transporting microwave energy and has a length that can be varied in multiples of ½ of the wavelength, $\lambda$, of the microwave that is transmitted by microwave generator 10. Typically, the frequency of the microwave generator is 2.45 GHz having a wavelength, $\lambda$, of about 4.8 inches (about 12 cm). The length of the coaxial cable typically includes a length, having a value used for matching impedance, in addition to the length measured in multiples of ½ of the wavelength, $\lambda$.

In FIG. 4, a microwave coupler 33 includes a fitting 42 that attaches the coaxial cable 41 perpendicularly to antenna 19 to couple microwave energy from the coaxial cable 41 through antenna 19 to the plasma chamber 11. Alternatively, microwave coupler 33 attaches the coaxial cable 41', shown in alternate location relative to cable 41, in line with the long direction of antenna 19 to couple microwave energy from the coaxial cable 41' through antenna 19 to the plasma chamber 11. The angle that the fittings make with the antenna 19 are selected to achieve good mechanical support and good microwave coupling. The microwave coupler 33 includes an antenna 19 that connects from the fitting 42 of the coaxial cable 41 or directly from the cable 41' into the plasma chamber 11 at a position within a non-conducing cover 25. The cover 25 has a vacuum seal 23 with the plasma chamber 11. In the embodiment of FIG. 4, the antenna 19 is fixed in length but alternatively can be adjustable, as shown in other embodiments, for tuning.

When the environment within plasma chamber 11 is suitable, a plasma is generated and operates to decompose gases flowing through the chamber 11. The cover 25 permits the antenna 19 to extend into the interior of the plasma chamber 11 without actual contact with the gases that are present. In this way, corrosion of the antenna by the gases in chamber 11 is avoided.

Figure 5:
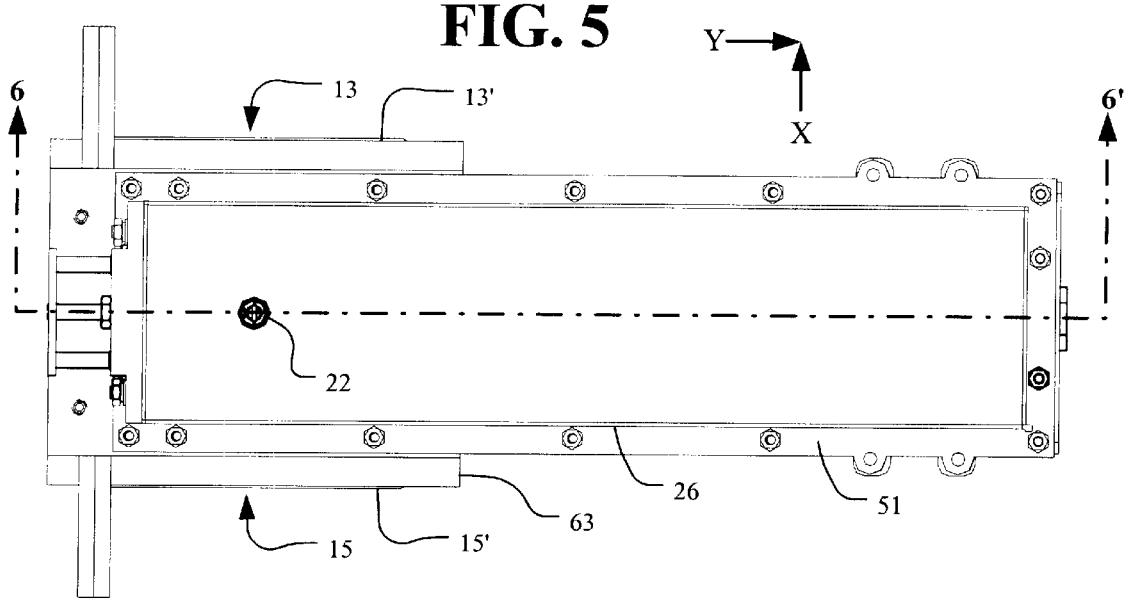
FIG. 5 depicts a detailed top view of a portion of the microwave reactor of FIG. 1 and FIG. 3.

FIG. 5 depicts a detailed top view of a portion of the FIG. 3 waveguide embodiment of the microwave reactor 7. The waveguide 26 is supported by a frame 51 and is attached to a housing 63 that contains the plasma chamber 11. The opening 22 is open to provide access for adjusting the position of the antenna that extends into the plasma chamber. A sectional view line 4–4' extends along the center of the waveguide 26.

Figure 6:
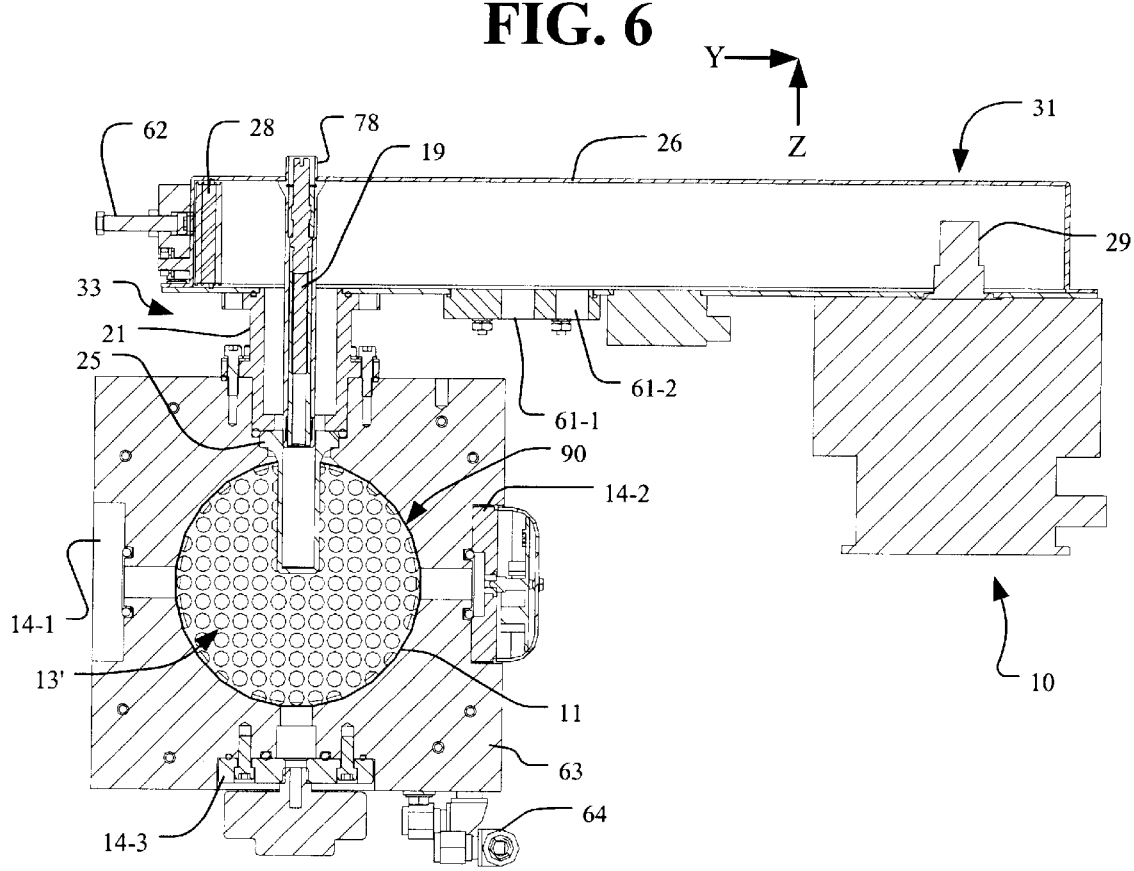
FIG. 6 depicts a detailed front sectional view along sectional view line 4–4' of FIG. 5.

FIG. 6 depicts a detailed front sectional view along sectional view line 6–6' of FIG. 5. The microwave generator 10 is coupled to the microwave waveguide 26 through a microwave coupler 31. The microwave coupler 31 includes antenna 29 that matches the impedance of the microwave generator 10 to the waveguide 26. The waveguide 26 has openings 61-1 and 61-2 for receiving turning stubs, like turning stubs 35-1 and 35-2 of FIG. 3, for turning the waveguide 26.

At the end of the microwave waveguide that is proximate to plasma chamber 11, a microwave coupler 33 couples the microwave energy from the waveguide 26 to the plasma chamber 11 within the housing 63. The microwave coupler 33 includes a hollow tube 78 that connects through the waveguide 26 into the plasma chamber 11 within a non-conducing cover 25. The tube 78 is made of Teflon®, ceramic, quartz or other material transparent to microwaves. The cover 25 has a vacuum seal 23 with the plasma chamber 11. The vacuum seal is made by bolting or otherwise fixing the connector 21 to the housing 63 of the plasma chamber 11. The tube 78 encloses a plasma antenna 19 that couples microwave energy from waveguide 26 into the plasma chamber 11. In FIG. 6, the antenna 19 is movable within the tube 78 so that the amount of extension of antenna 19 into plasma chamber 11 is adjustable. In the position shown in FIG. 6, the antenna 19 is retracted from the interior of the plasma chamber 11. The adjustment of antenna 19 aids in matching the impedance between the waveguide 26 and the plasma chamber 11. The cover 25 permits the tube 78 and the antenna 19 to extend into the interior of the plasma chamber 11 without actual contact with the gases that are present. The cover 25 is typically made of a one-piece ceramic material such as aluminum oxide and has a flange on one end for forming a tight seal to the connector 21.

In FIG. 6, the screen 13' is in good electrical contact with the housing 63 that encloses the microwave chamber. The screen 13', for example, is formed of a metal sheet having holes of a few millimeters in diameter closely space with offsets of a millimeter or more. The object of the screen is to provide a good microwave barrier without impeding the flow of the gas to be reacted. Also, the screen 13' is a good location to deposit a catalyst for the reaction in the microwave chamber. A catalyst can be located at other locations in the plasma chamber 11, for example, as a lining 90, on the interior wall of the plasma chamber 11.

Figure 7:
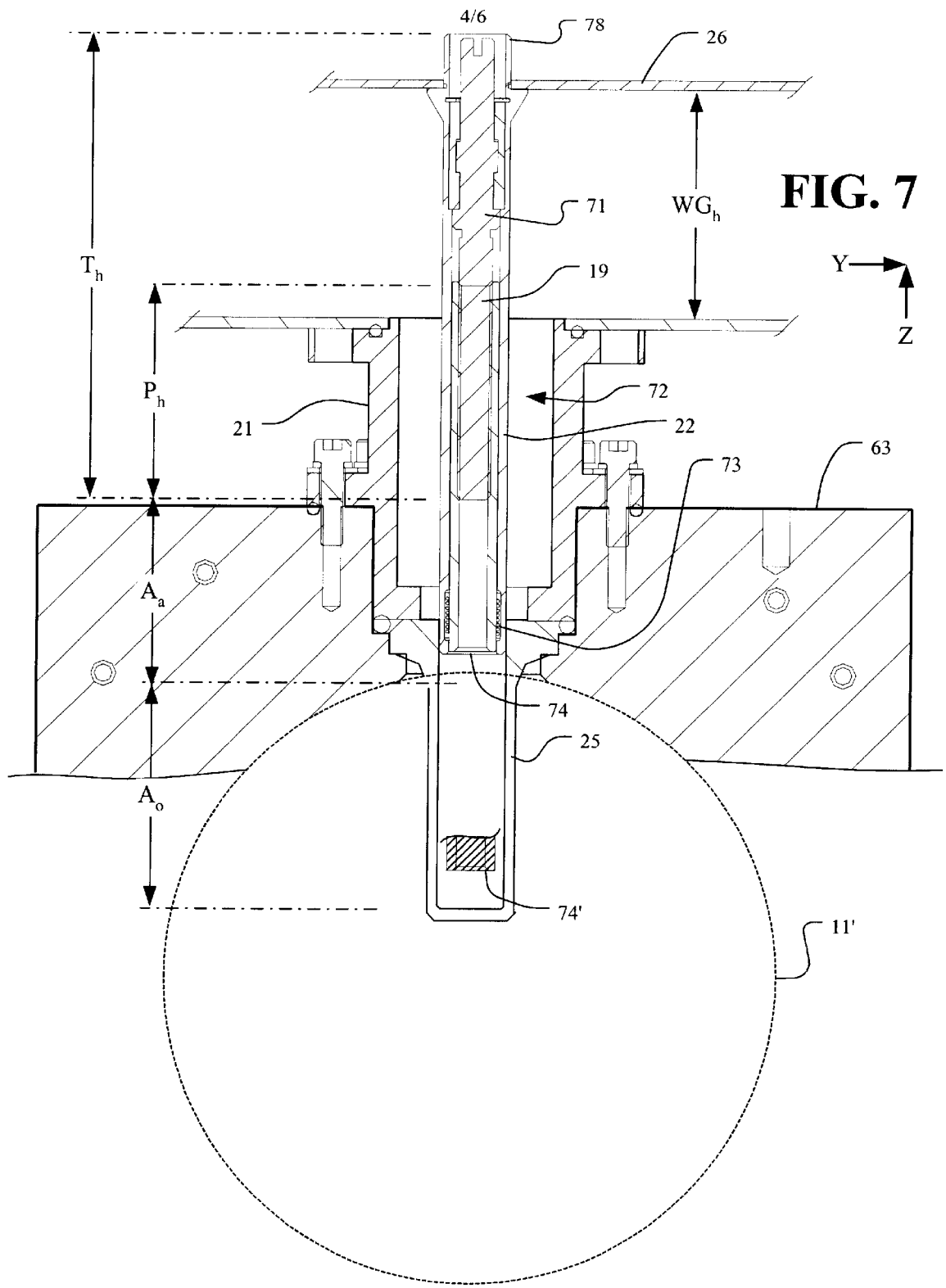
FIG. 7 depicts an enlarged sectional view of a portion of the microwave antenna of the FIG. 5 view.

FIG. 7 depicts an enlarged view of a portion of the FIG. 6 view of the microwave reactor 7. In FIG. 7, an outline of the plasma chamber 11 is shown. A plasma antenna 19 is slidably engaged for insertion into and retraction from the plasma chamber 11 through tube 78. Tube 78 is located in the center of the connector 21 and is surrounded by an air pocket 72. Tube 78 includes a slide member 73 made of Teflon® or other material transparent to microwaves and providing a good surface for sliding engagement. The plasma antenna 19, typically made of aluminum, couples microwave energy from the waveguide 26. The waveguide 26 has a conducting wall 50 which is typically aluminum and about 1/32 inch (0.8 mm) thick. In the position shown in FIG. 7, the antenna 19 is retracted from the interior of the plasma chamber 11 with the tip 74 of antenna 19 upward in the Z axis direction. By vertical adjustment, the antenna 19 is movable to any position in the Z axis direction, for example, to a position as shown by tip 74'. The antenna 19 fits within tube 78 and tube 78 is typically formed of aluminum or other metal. In the FIG. 7 embodiment, the elevation of the antenna 19 is adjustable by movement of the antenna extension 71. In other embodiments, the antenna is fixed and not movable. The core of antenna 19 is typically solid and formed of aluminum having a diameter of about 0.5 inch (1.3 cm). The height, $T_h$, of the core of antenna 19 and the extender 71 is about 4 inches (10 cm). The height, $P_h$, of the core 19 is about 1.8 inch (4.6 cm). The height, $A_a$, of the antenna bottom above the plasma chamber 11 is about 1.8 inches (4.6 cm). The height, $A_o$, of the extension of cover 25 into the plasma chamber 25 is about 2 inches (5.1 cm). The diameter of the plasma chamber 11 is about 4 inches (10 cm). The connector 21 has an outer diameter of about 2.4 inch (6.1 cm) and an inner diameter of about 1.8 inch (4.6 cm). In order to have efficient transfer of energy from the waveguide 26 to the plasma chamber 11', the flange structure of the connector 21 and the waveguide 26 the antenna 198 and cover 25 act to impedance match the antenna and the plasma in the chamber.

Figure 8:
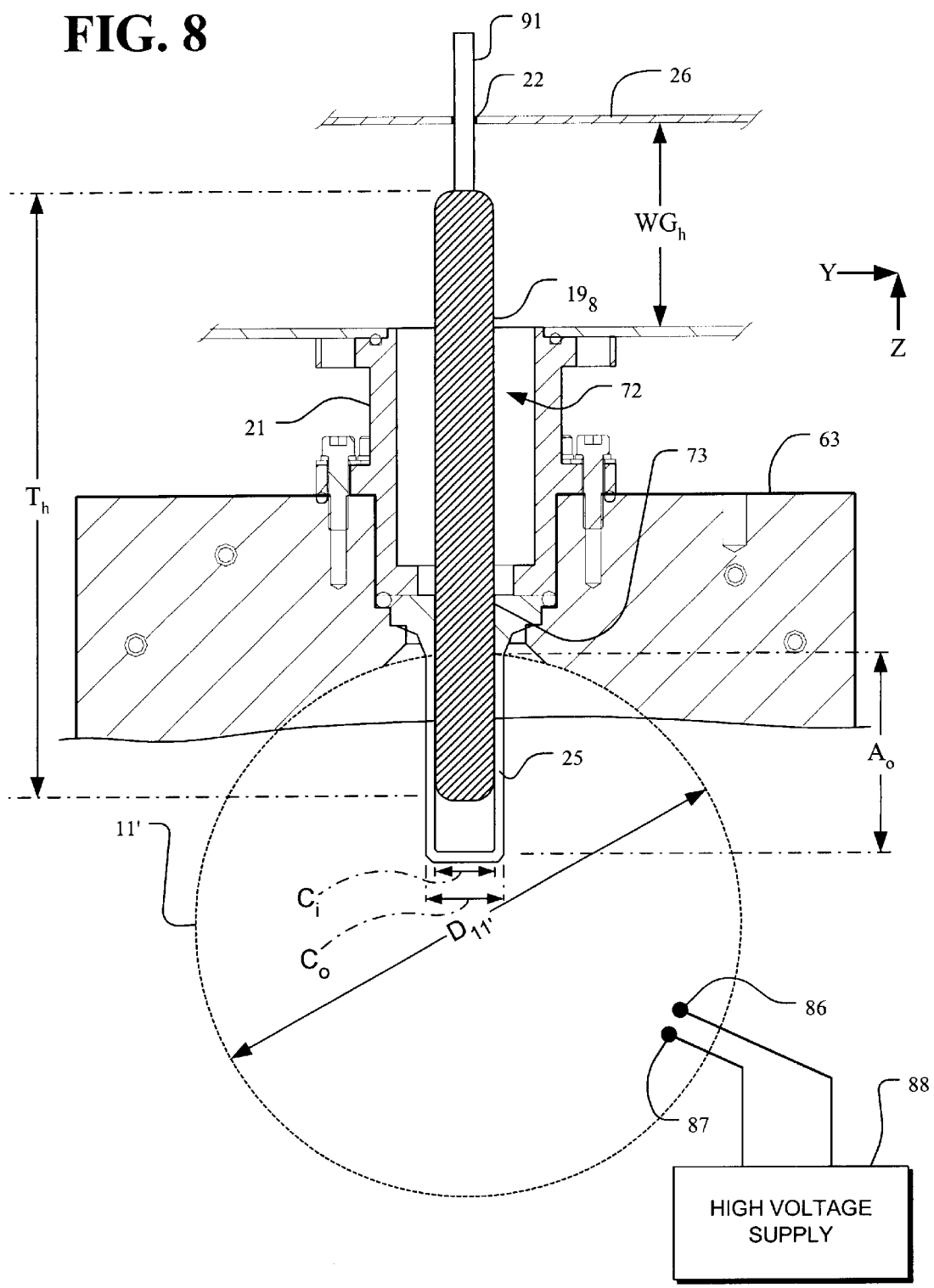
FIG. 8 depicts an alternate embodiment of an enlarged sectional view of a portion of the microwave antenna of the FIG. 5 view.

FIG. 8 depicts an alternate embodiment of an enlarged view, analogous to the FIG. 7 view, of a portion of a microwave reactor 7. In FIG. 8, an outline of the plasma chamber 11 ' is shown. A plasma antenna $19_8$ is slidably engaged for insertion into and retraction from the plasma chamber 11'. Plasma antenna $19_8$ extends into the center of the connector 21 and is surrounded by an air pocket 72. An opening 22 in the wall of waveguide 26 receives a vertical adjustment member 91 through a grommet 22 typically made of Teflon®, ceramic or other material transparent to microwaves and providing a good surface for sliding engagement with member 91. The vertical adjustment member 91 is attached to plasma antenna $19_8$ and is used for adjusting the vertical position, along the Z axis, of the antenna $19_8$. The plasma antenna $19_8$, typically made of aluminum or other good microwave conductor, couples microwave energy from the waveguide 26 into the plasma chamber 11'. The waveguide 26 has a conducting wall 50 which is typically aluminum and about 1/32 inch (0.8 mm) thick. In the position shown in FIG. 8, the antenna $19_8$ is inserted into the interior of the plasma chamber 11'. In the FIG. 8 embodiment, the elevation of the antenna $19_8$ is adjustable along the Z axis by Z axis movement of the antenna extension 91. In other embodiments, the antenna $19_8$ is fixed and not movable. The core of antenna $19_8$ is typically solid and formed of aluminum having a diameter of about 0.5 inch (1.3 cm). The height, $T_h$, of the core of antenna $19_8$ is about 4 inches (10 cm). The height, $A_o$, of the extension of cover 25 into the plasma chamber 11' is about 2 inches (5.1 cm). The diameter, $D_{11'}$, of the plasma chamber 11' is about 4 inches (10 cm). The ceramic cover 21 has an outer diameter, $C_o$, of about 0.8 inch (2 cm) and an inner diameter, $C_i$, of about 0.6 inch (1.5 cm). In order to have efficient transfer of energy from the waveguide 26 to the plasma chamber 11, the structure and dimensions of the connector 21 and the waveguide 26 together with antenna $19_8$ and cover 25 impedance match antenna $19_8$ to the chamber 11'. The antenna $19_8$ is moved in the vertical, Z axis, direction to further tune the impedance matching.

In FIG. 8, in order to quickly start the plasma operation, high voltage ignitor electrodes 86 and 87 are optionally provided for suppling a high voltage path into plasma chamber 11. In many embodiments, such electrodes are not required. When used, the electrodes are coupled to a high voltage supply 88 and cause a spark inside of plasma chamber 11. The spark within the plasma chamber 11 ignites a gas plasma as the result of an arc within the chamber. A plasma is ignited when a sufficient number of gas particles are present in a cloud within the central region of plasma chamber 11.

Figure 9:
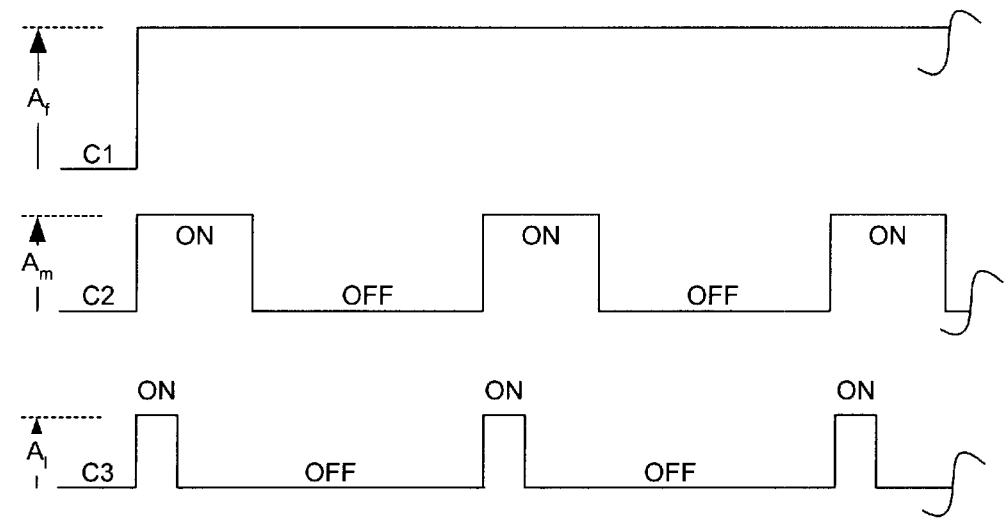
FIG. 9 depicts a representation of the microwave power duty cycles used in controlling the microwave energy in the microwave reactor of FIG. 1.

In FIG. 9, the signals used for a pulsed power embodiment are shown. The C1 waveform represents a power full ON operation with amplitude, $A_f$, which is typically employed at the start of plasma operation to help initiate generation of the plasma in the gas. The C2 waveform represents an ON/OFF duty cycle of about 30/70 with medium power amplitude, $A_m$, during the ON portion of the cycle. The C3 waveform represents a low ON/OFF duty cycle of about 10/90 with low power amplitude, $A_l$, during the ON portion of the cycle. When using a low duty cycle, the microwave energy tends to be used in production of electrons and not in heating of the gas. The electrons perform the cracking of the molecules and facilitate the chemical reactions. In certain structures when the power is ON continuously, the majority of the energy of the electrons is used to heat the gas and not concentrated on the chemical reactions. Also, many reactions prefer a lower gas temperature than occurs at maximum microwave power. With an average power some value less than 100% of a continuous power source, better results are achieved in some embodiments. The ON/OFF duty cycle is adjustable to reduce the power supplied. The actual value of the duty cycle is achieved by experimentation for any particular embodiment. The control of the power and duty cycle has the advantages of requiring less consumption of electricity, less heating of the gases while permitting load control and flexible set-up and processing that tolerates wide changes in the process parameters.

Figure 10:
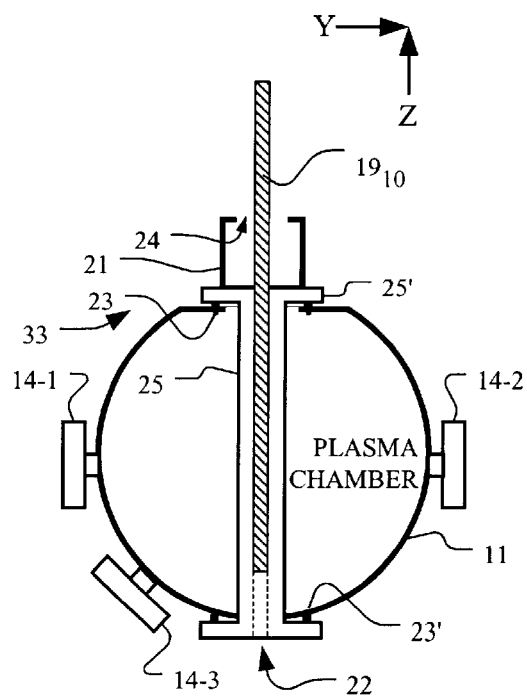
FIG. 10 depicts an alternate embodiment of the microwave reactor plasma chamber of FIG. 3.

In FIG. 10 an alternate embodiment of the microwave reactor plasma chamber 11 of FIG. 3 is shown where the cover 25' extends all the way through the plasma chamber 11. The opening 24 and connector 21 of the microwave coupler 33 receive an antenna $19_{10}$ that penetrates into the plasma chamber 11 within the non-conducting cover 25'. The cover 25' has vacuum seals 23 and 23' with the plasma chamber 11. The cover 25' encloses plasma antenna $19_{10}$ that couples microwave energy from waveguide 26 (see FIG. 8) into the plasma chamber 11. In the embodiment of FIG. 10, the antenna $19_{10}$ is movable within the cover 25' so that the amount of extension of antenna $19_{10}$ into plasma chamber 11 is adjustable. The cover 25' permits the antenna $19_{10}$ to extend into and through the interior of the plasma chamber 11 without actual contact with the gases that are present in chamber 11. The microwave components including the interior to cover 25' and the antenna $19_{10}$ are all located external to locations where a vacuum is required.

Figure 11:
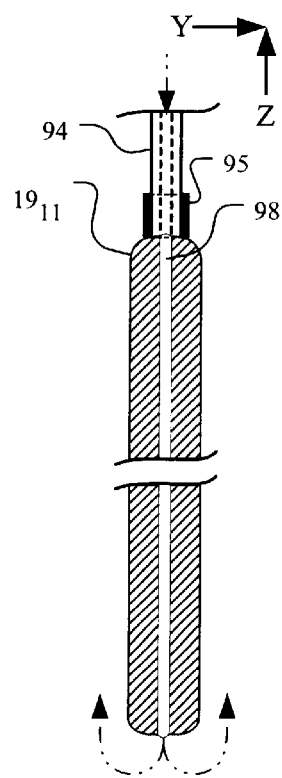
FIG. 11 depicts an alternate embodiment of an antenna with a center cooling hole 92.

In FIG. 11, an alternate embodiment, antenna 19₁₁, is shown with a center cooling hole 92. The cooling hole 92 mates with the cooling line 94 that connects to the cooling unit 93 of FIG. 1. In connection with the embodiment of FIG. 8, air or other cooling gas is injected into the hole 92 by the cooling unit 93 into the opening of cover 25 and passes through a clearance distance between the antenna 19 into the interior 72 of connector 21 and out through leakage holes (not specifically shown) in waveguide 26 to the atmosphere. Accordingly, the embodiment of FIG. 11, when used in FIG. 8, tends to cool both the antenna 19 and the waveguide 26. The waveguide 26 is specifically designed not to be air or other gas tight, the only design objective is to be a good microwave conductor without substantial microwave leakage for human safety considerations. The cooling material can be air, nitrogen or any other cooling material suitable for microwave environments.

Figure 12:
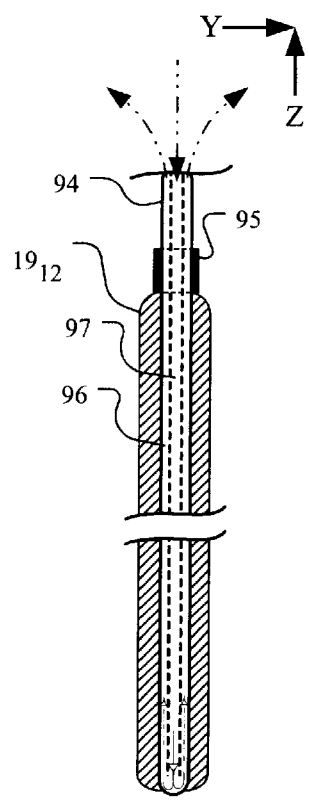
FIG. 12 depicts another alternate embodiment of an antenna with a bidirectional center cooling member.

In FIG. 12, an alternate embodiment, antenna 19₁₂, is shown with center cooling holes 96 and 97 which provide for bidirectional flow of a cooling gas or liquid. The cooling holes 96 and 97 mate with corresponding holes in the cooling line 94 that connects to the cooling unit 93 of FIG. 1. In connection with the embodiment of FIG. 8, air, water or other cooling gas or liquid is injected into the inner hole 97 and extracted from the outer hole 96, or vice versa, by the cooling unit 93 by means of line 94' and connector 95. Accordingly, the embodiment of FIG. 12, when used in FIG. 8, tends to cool antenna 19₁₂ by flow into hole 97 and out from hole 96.

While the invention has been particularly shown and described with reference to preferred embodiments thereof it will be understood by those skilled in the art that various changes in form and details may be made therein without departing from the scope of the invention.

What is claimed is:

1. A microwave decomposition reactor comprising,
   a plasma chamber having a gas inflow port spaced apart from a gas outflow port for transporting gases through the plasma chamber, an insulating cover protruding into the plasma chamber and forming an internal cavity in the plasma chamber that is isolated from gases in the plasma chamber,
   a microwave generator for generating microwave power,
   a microwave connector for connecting microwave power from the microwave generator to the plasma chamber, said microwave connector including,
      a microwave transport for transporting the microwave energy,
      a first microwave coupler for coupling the microwave energy from the microwave generator to the microwave transport with a matched impedance,
      a second microwave coupler for coupling the microwave energy from the microwave transport to the plasma chamber with a matched impedance, said second microwave coupler including an antenna for extending into the internal cavity of the plasma chamber for causing a plasma to form in said gases in response to delivery of the microwave energy.

2. The reactor of claim 1 wherein the plasma chamber is formed of a conductive housing and includes an input screen at said input port electrically connected to said conductive housing and includes an output screen at said output port electrically connected to said conductive housing.

3. The reactor of claim 2 wherein at least one of said input screen or said output screen contains a catalyst.

4. The reactor of claim 2 wherein a catalyst is deposited as a lining on said housing.

5. The reactor of claim 1 wherein the plasma chamber is a tubular structure connected to exhaust piping from an industrial process.

6. The reactor of claim 5 wherein said tubular structure has a diameter of approximately 4 inches.

7. The reactor of claim 1 wherein said insulating cover protrudes partway into the plasma chamber.

8. The reactor of claim 1 wherein said insulating cover protrudes entirely through the plasma chamber.

9. The reactor of claim 1 wherein the microwave transport is a waveguide.

10. The reactor of claim 9 wherein said waveguide has one or more tuning stubs establishing resonance in the waveguide.

11. The reactor of claim 9 wherein said waveguide has an adjustable wall for matching impedance with said second microwave coupler.

12. The reactor of claim 1 wherein the microwave transport is a coaxial line.

13. The reactor of claim 1 wherein the gas includes perfluorinated and/or hydrofluorocarbon compounds.

14. The reactor of claim 1 wherein said plasma chamber includes a reactant port for injecting oxygen, hydrogen and water vapor.

15. The reactor of claim 1 having a high voltage electrodes disposed to ignite a gas plasma.

16. The reactor of claim 1 further including a control means for controlling the power generated by said microwave generator.

17. The reactor of claim 16 wherein said control means operates to control said microwave generator to have a pulsed power operation with an ON/OFF duty cycle.

18. The reactor of claim 1 having a cooling unit for cooling components in the microwave reactor.

19. The reactor of claim 18 wherein said antenna includes one or more inner holes for transporting a cooling material from said cooling unit.

20. The reactor of claim 19 wherein said cooling material is a gas.

21. The reactor of claim 20 wherein said gas is nitrogen or air.

22. The reactor of claim 19 wherein said cooling material is a liquid and said one or more holes includes an inner hole connected at one end to an outer hole whereby a closed connection suitable for a cooling liquid is provided internal to said antenna.

* * * * *